United States Patent Office 2,994,221
Patented Aug. 1, 1961

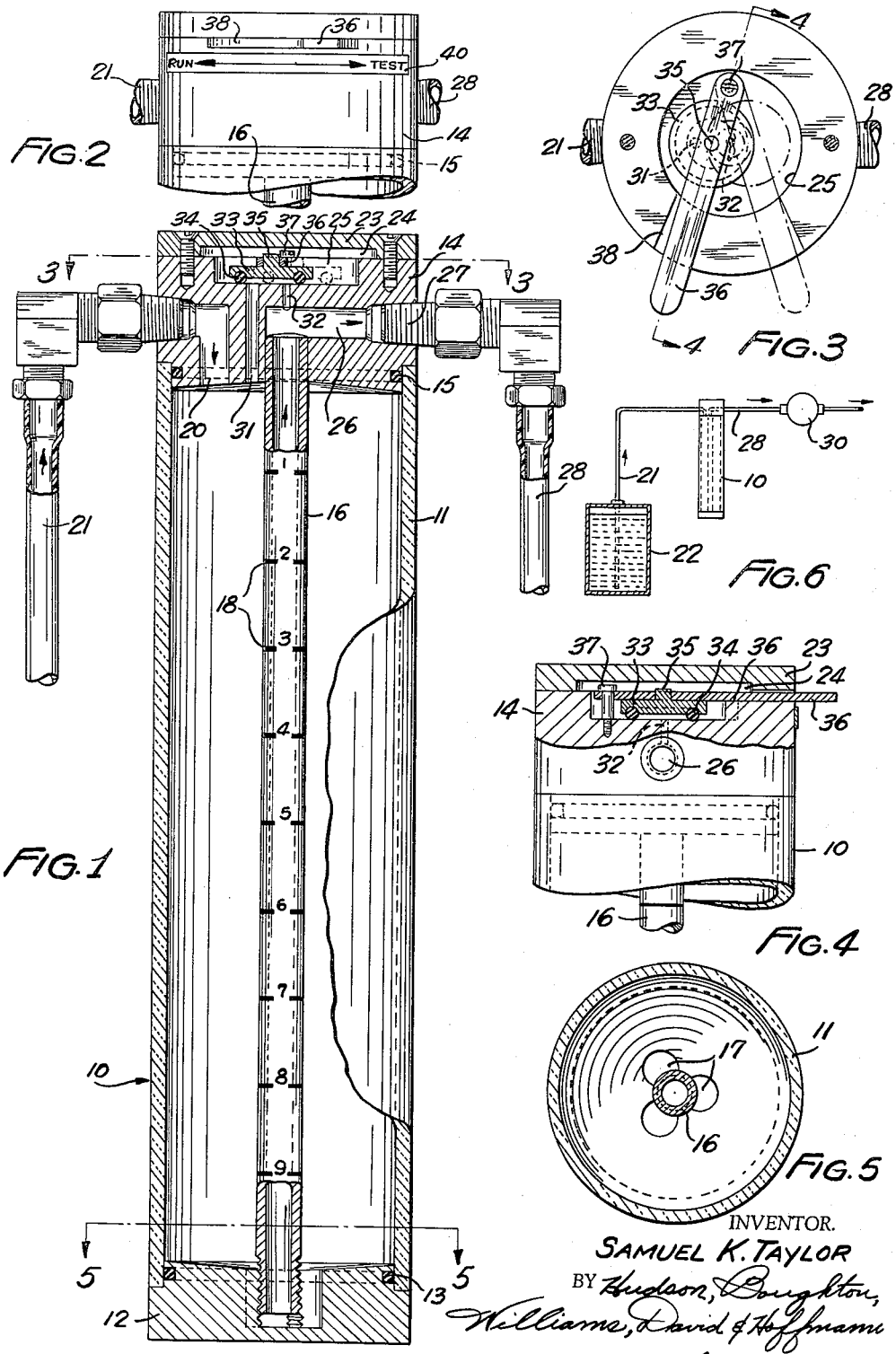

2,994,221
LIQUID METERING GAUGE
Samuel K. Taylor, 2711 Derbyshire Road,
Cleveland Heights, Ohio
Filed Sept. 3, 1957, Ser. No. 681,609
3 Claims. (Cl. 73—113)

This invention relates to improvements in liquid metering gauges. It has application especially to gauges for collecting a measured quantity of liquid in a container and then discharging that container. For example, the invention finds utility in an automobile for collecting in a container a measured quantity of gasoline in the fuel supply system, and then feeding that quantity to the automobile engine while noting the mileage at the beginning and end of the operation for the purpose of determining the number of miles traveled. Conveniently, the quanity collected and fed to the engine may be ⅒ of a gallon, so that when the mileage obtained from that quantity is determined, it may be multiplied by 10 to give the number of miles per gallon.

The device may be operated to enable the operator to determine the efficiency of the car at different speeds, its efficiency with different fuels, its efficiency in hill climbing, or on different kinds of road surfaces, etc.

One of the objects of the invention, therefore, is the provision of a simple, readily installed apparatus for this purpose.

Another object is the provision of an apparatus of the character described, which requires the utilization of but two conductors, thereby lessening first cost, the possibility of mistakes in installation and the errors which might result from leakage due to faulty connection of more numerous parts.

A further object is the provision of an apparatus which may be shifted from running to test position and vice versa instantaneously, or practically so.

Other objects and features of novelty will appear as I proceed with the description of that embodiment of the invention which, for the purposes of the present application I have illustrated in the accompanying drawing, in which FIG. 1 is a vertical, sectional view of a metering gauge built in accordance with the invention;

FIG. 2 is a fragmental, elevational view of the upper end of the device;

FIG. 3 is a plan view with the cap of the container removed, the view being taken substantially on the line 3—3 of FIG. 1;

FIG. 4 is an elevational view partly in section on the line 4—4 of FIG. 3;

FIG. 5 is a detail, sectional view on the line 5—5 of FIG. 1; and

FIG. 6 is a diagrammatic view showing the hook-up of the invention in an automobile having a vacuum pump for lifting fuel to the carburetor.

In the drawing a vessel, preferably elongated vertically, and adapted to hold a measured quantity of fuel, is shown at 10. This vessel comprises a transparent tubular member 11 and a base 12, the joint being sealed by an O-ring 13 or other gasket.

The top of the tubular member 11 may be closed with a block 14 fitted into the tubular member and sealed with an O-ring 15. At the center of the block 14 there is fitted a depending tube 16 which constitutes a discharge conductor having its lower end extending down into a sump at the bottom of the vessel formed by three drilled sockets 17. This tube may carry the gauge marks shown at 18, and the capacity of the vessel between adjacent gauge marks in the illustrated case may be ¹⁄₁₀₀ of a gallon.

In the block 14 there is an angular passage 20 with which a conductor 21 communicates, that may lead to an automobile fuel tank indicated at 22 in FIG. 6, the lower end of the conductor extending to the bottom of the tank where it will always be covered by the fuel in the tank.

In the block 14 there is a horizontal passage 26 in the outer end of which there is a fitting 27 that is connected with a conductor 28. The passage 26 and the top of the tube of the discharge conductor 16 are always in communication. The conductor 28 leads to a vacuum inducing means such as a vacuum pump 30, which causes the gasoline raised through the conductor 28 to flow to the carburetor of the car engine.

Between the valve chamber 25 and the top of the vessel 10 there is a vertical passage 31, while a second smaller passage 32 connects the valve chamber 25 with the passage 26. A slide valve 33 with a circular gasket 34 on its lower side, when positioned as shown in FIG. 1, connects the passages 31 and 32 and cuts off from atmosphere the space at the top of vessel 10. An upwardly extending projection 35 on the slide valve 33 is received in a round hole in a lever 36, which is pivoted upon a headed screw 37 projecting upwardly from the block 14. The lever 36 extends outwardly through a slot 38 in one side of the block 14. A thin metal plate 40 may be attached to the side of block 14 below the slot 38 to indicate the run and test positions for the lever 36, as indicated in FIG. 2.

When the lever 36 is drawn to the dotted line position of FIG. 3, the slide valve 33 moves to the dotted line position of FIG. 1 and the full line position of FIG. 4. In this position the passage 31 is open at the top, exposing the space within the vessel 10 to atmosphere. At the same time, it closes passage 32.

The operation of the metering gauge will be easily understood from an inspection of the drawing. The lever 36 will ordinarily occupy the position indicated in full lines in FIGS. 1 and 3, which is the run position. In this position, suction will be available at the top of vessel 10 through conductor 28 and passages 26, 32 and 31. This will raise gasoline from the fuel tank 22 of the car, through conductor 21, and deposit it in the vessel 10 through the passage 20. During the filling operation air present in vessel 10 will be drawn off through passages 31, 32 and 26 along with gasoline drawn off through discharge tube 16, both air and gasoline passing out through conductor 28. The air removed is replaced by liquid from the fuel tank until all of the air is removed and the vessel is completely filled with liquid. Now the operator may draw the lever 36 over to the right to the test position, at the same time noting the mileage indication at that time. Thereupon the liquid in the vessel will be subjected to atmospheric pressure through the slot 38, the valve chamber 25, and the passage 31. The suction in conductor 28 and in tube 16 will draw off the gasoline from the vessel 10 through the discharge tube 16, as the engine requires it. The operator will watch the level in the vessel as the engine consumes gasoline. As soon as the level reaches the zero point the operator will take another odometer reading. He can then throw the lever back to the run position so that the vessel 10 will begin to refill. The difference between the two mileage readings will be the distance traveled by the car in consuming ⅒ of a gallon of fuel, so that this distance in miles and fractions of miles when multiplied by 10 will be the mileage per gallon under the given conditions of operation.

Having thus described my invention, I claim:

1. A liquid metering assembly comprising a transparent vessel, a block mounted at the top of said vessel in closing relation thereto, said block having a liquid inlet passage and a liquid outlet passage, said liquid inlet passage opening directly into said vessel and being adapted to be connected through a liquid supply conductor to a supply tank with said vessel being above the level of the tank, a tube depending from said block and extending downwardly into said vessel, said liquid outlet passage communicating with the interior of said vessel through an opening in said tube adjacent the bottom of said vessel, said liquid outlet passage being adapted to be connected to the intake side of a pump, said block having an air passage extending from an outer surface thereof and opening directly into said vessel, said block having an additional passage extending from said outer surface thereof and opening into said liquid outlet passage, and valve means mounted on said block and movable between first and second positions, said valve means closing said air passage against the entry of atmospheric air and connecting said air passage with said additional passage when in said first position, said valve means opening said air passage to atmospheric air and blocking said additional passage when in said second position.

2. A liquid metering assembly as defined in claim 1 and wherein said valve means comprises a lever pivoted to said block and a valve element connected to said lever for movement therewith between said first and second positions, said valve element having an annular gasket in sliding engagement with said block and adapted to be positioned over said air passage and said additional passage.

3. A liquid fuel metering assembly comprising a transparent vessel, a block member in closing relation to the top of said vessel and having a first passage for admitting fuel into said vessel, a tube depending from said block downwardly in said vessel, said block member having a second passage connected with said tube and serving as a fuel outlet passage, said second passage communicating with the interior of said vessel through an opening in said tube adjacent the bottom of said vessel, said first passage being adapted to be connected to a liquid fuel tank with said vessel above the level of the tank and said second passage being adapted to be connected to the intake side of a fuel pump, said block member having a valve chamber communicating with the atmosphere, said block having a third passage extending from said valve chamber and opening it into said vessel, said block having a fourth passage extending from said valve chamber and opening into said second passage, and a valve element in said valve chamber and slidable on said block between a plurality of operative positions, said valve element being movable into a first position for connecting said third and fourth passages and preventing atmospheric air from entering therein so that vacuum applied at said second passage will draw fuel from a tank through said first passage for filling said vessel and through second passage by way of said third and fourth passages, said valve element being movable into a second position for blocking said fourth passage and opening said third passage to the atmosphere so that upon applying a vacuum at said second passage fuel will be drawn from said vessel through said second passage by way of said tube and atmospheric air will enter said vessel through said third passage for replacing said fuel drawn from said vessel.

References Cited in the file of this patent

UNITED STATES PATENTS

| | | |
|---|---|---|
| 2,309,386 | Gauthier | Jan. 26, 1943 |
| 2,493,757 | Fish | Jan. 10, 1950 |
| 2,652,719 | Bracci | Sept. 22, 1953 |